(12) United States Patent
Hussain et al.

(10) Patent No.: US 9,124,569 B2
(45) Date of Patent: Sep. 1, 2015

(54) USER AUTHENTICATION IN A CLOUD ENVIRONMENT

(71) Applicant: Microsoft Corporation, Redmond, WA (US)

(72) Inventors: Amjad Hussain, Kirkland, WA (US); Andrew Eremenko, Woodinville, WA (US); Mahadeva Kumar Alladi, Sammamish, WA (US); Sriram Sampath, Redmond, WA (US); Tristan William Scott, Issaquah, WA (US); Travis Michael Howe, Bellevue, WA (US); Ido Miles Ben-Shachar, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 53 days.

(21) Appl. No.: 13/917,861

(22) Filed: Jun. 14, 2013

(65) Prior Publication Data
US 2014/0373126 A1 Dec. 18, 2014

(51) Int. Cl.
| | |
|---|---|
| *G06F 7/04* | (2006.01) |
| *H04L 29/06* | (2006.01) |
| *G06F 21/33* | (2013.01) |

(52) U.S. Cl.
CPC .............. *H04L 63/08* (2013.01); *G06F 21/335* (2013.01); *H04L 63/0807* (2013.01); *H04L 63/0815* (2013.01); *H04L 63/10* (2013.01)

(58) Field of Classification Search
CPC ................................ H04L 63/08; G06F 21/10
USPC ............. 729/8, 9, 10; 726/9, 22, 26; 713/155, 713/168, 183, 184
See application file for complete search history.

(56) References Cited

U.S. PATENT DOCUMENTS

| | | | | |
|---|---|---|---|---|
| 7,103,771 | B2 * | 9/2006 | Grawrock ...................... | 713/155 |
| 7,155,321 | B2 * | 12/2006 | Bromley et al. ............. | 701/29.6 |

(Continued)

FOREIGN PATENT DOCUMENTS

WO    WO 2011134002 A1    11/2011

OTHER PUBLICATIONS

International Search Report & Written Opinion for PCT Patent Application No. PCT/US2014/041614, Mailed Date: Sep. 25, 2014, Filed Date: Jun. 10, 2014, 13 pages.

(Continued)

*Primary Examiner* — Abu Sholeman
(74) *Attorney, Agent, or Firm* — Timothy Churna; Sade Fashokun; Micky Minhas (57) ABSTRACT

Embodiments are directed to authenticating a user to a remote application provisioning service. In one scenario, a client computer system receives authentication credentials from a user at to authenticate the user to a remote application provisioning service that provides virtual machine-hosted remote applications. The client computer system sends the received authentication credentials to an authentication service, which is configured to generate an encrypted token based on the received authentication credentials. The client computer system then receives the generated encrypted token from the authentication service, stores the received encrypted token and the received authentication credentials in a data store, and sends the encrypted token to the remote application provisioning service. The encrypted token indicates to the remote application provisioning service that the user is a valid user.

20 Claims, 5 Drawing Sheets

(56) References Cited

U.S. PATENT DOCUMENTS

| | | | |
|---|---|---|---|
| 7,197,125 | B1 | 3/2007 | Prasad et al. |
| 7,469,345 | B2* | 12/2008 | Shimada et al. ............. 713/193 |
| 7,823,192 | B1* | 10/2010 | Fultz et al. ........................ 726/7 |
| 7,864,957 | B2* | 1/2011 | Shimada et al. ............. 380/233 |
| 8,219,828 | B2* | 7/2012 | Maetz et al. .................. 713/190 |
| 8,312,272 | B1* | 11/2012 | Serenyi et al. ............... 713/168 |
| 8,739,265 | B2* | 5/2014 | Ang et al. ......................... 726/9 |
| 8,752,208 | B2* | 6/2014 | Shulman et al. ............... 726/30 |
| 8,800,009 | B1* | 8/2014 | Beda et al. ........................ 726/6 |
| 8,838,961 | B2* | 9/2014 | Zarfoss et al. ............... 713/155 |
| 8,863,255 | B2* | 10/2014 | Zarfoss et al. .................. 726/6 |
| 2003/0115453 | A1* | 6/2003 | Grawrock .................... 713/155 |
| 2003/0123670 | A1* | 7/2003 | Shimada et al. ............. 380/281 |
| 2003/0126430 | A1* | 7/2003 | Shimada et al. ............. 713/155 |
| 2004/0093515 | A1 | 5/2004 | Reeves |
| 2011/0125894 | A1* | 5/2011 | Anderson et al. ............ 709/224 |
| 2011/0191767 | A1* | 8/2011 | Pinsky et al. ................. 717/176 |
| 2011/0209064 | A1* | 8/2011 | Jorgensen et al. ........... 715/733 |
| 2011/0214176 | A1 | 9/2011 | Burch et al. |
| 2011/0231840 | A1 | 9/2011 | Burch et al. |
| 2012/0011578 | A1* | 1/2012 | Hinton et al. .................... 726/8 |
| 2012/0110571 | A1* | 5/2012 | Smith et al. ...................... 718/1 |
| 2012/0151568 | A1* | 6/2012 | Pieczul et al. .................... 726/8 |
| 2012/0159180 | A1* | 6/2012 | Chase et al. ................. 713/183 |
| 2012/0278621 | A1* | 11/2012 | Woloszyn .................... 713/168 |
| 2012/0278897 | A1* | 11/2012 | Ang et al. ....................... 726/26 |
| 2012/0290702 | A1 | 11/2012 | Vincent |
| 2012/0291129 | A1* | 11/2012 | Shulman et al. ............... 726/23 |
| 2013/0007465 | A1* | 1/2013 | Movassaghi ................. 713/186 |
| 2014/0033291 | A1* | 1/2014 | Liu .................................... 726/7 |
| 2014/0082349 | A1* | 3/2014 | Zarfoss et al. ............... 713/155 |
| 2014/0082350 | A1* | 3/2014 | Zarfoss et al. ............... 713/155 |

OTHER PUBLICATIONS

"Claims-Based Single Sign-On for the Web and Windows Azure", Published on: Feb. 3, 2010, Available at: http://msdn.microsoft.com/en-us/library/ff359102.aspx.

"VDI/Desktop Virtualization", Published on: Sep. 15, 2012, Available at: http://www.f5.com/it-management/solutions/desktop-virtualization/overview/.

Carter, Michelle, "Secure Identity in Cloud Computing", Published on: Mar. 20, 2013, Available at: http://csse.usc.edu/gsaw/gsaw2013/s11b/carter.pdf.

"Remote Authentication in SharePoint Online Using Claims-Based Authentication", Published on: May 2011, Available at: http://msdn.microsoft.com/en-us/library/hh147177(v=office.14).aspx.

"Microsoft and Citrix Joint Virtual Desktop Infrastructure (VDI) Offering", Published on: Jul. 2009, Available at: http://unicomgov.com/files/1713/6371/5764/Microsoft-Citrix-VDI-Architectural-Guidance.pdf.

"Deploying Authenticated VMware Virtual Desktop Infrastructure (VDI) Solutions Using EMC Celerra Storage and RSA SecurID", In White Paper of EMC, Sep. 2008, 11 pages.

* cited by examiner

USER AUTHENTICATION IN A CLOUD ENVIRONMENT

BACKGROUND

Cloud computing has become increasingly popular for a variety of reasons. For instance, cloud computing allows applications and their associated data to be processed and stored on remote cloud servers. These cloud servers could be physically located anywhere in the world. Typically, these cloud-based applications provide data to users once the user has authenticated to the cloud network. These cloud servers, however, are public-facing, and as such, some application providers may be reluctant to provide applications that require access to sensitive data.

BRIEF SUMMARY

Embodiments described herein are directed to authenticating a user to a remote application provisioning service. In one embodiment, a client computer system receives authentication credentials from a user at to authenticate the user to a remote application provisioning service that provides virtual machine-hosted remote applications. The client computer system sends the received authentication credentials to an authentication service, which is configured to generate an encrypted token based on the received authentication credentials. The client computer system then receives the generated encrypted token from the authentication service, stores the received encrypted token and the received authentication credentials in a data store, and sends the encrypted token to the remote application provisioning service. The encrypted token indicates to the remote application provisioning service that the user is a valid user.

Optionally, the client computer system further receives, from the remote application provisioning service, an indication of remote applications the user is allowed to access. The client computer system receives, from the user, an indication indicating that at least one of the remote applications is to be instantiated. The client computer system then sends the user's stored authentication credentials and the stored encrypted token to the virtual machine that is hosting the specified remote application and, upon being authenticated to the virtual machine that is hosting the specified remote application, accesses the specified remote application.

In another embodiment, a remote application provisioning service receives an encrypted token from a client computer system, where the encrypted token is generated based on authentication credentials provided by a user. The remote application provisioning service decrypts the received encrypted token, determines the user's identity from the decrypted token, determines, based on the user's identity, which remote applications the user is authorized to access, and provides to the user an indication of those remote applications that are available for use.

In yet another embodiment, a remote application provisioning service receives an indication from a user indicating that a specified remote application is to be instantiated. The indication includes an encrypted token that was generated based on the authentication credentials. The remote application provisioning service then decrypts the received encrypted token to determine the user's identity, verifies that the user has permission to access the specified remote application, and sends the encrypted token to a remote application virtual machine host that provides access to the specified remote application using the encrypted token and the user's authentication credentials.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to authenticating a user to a remote application provisioning service. In one embodiment, a client computer system receives authentication credentials from a user at to authenticate the user to a remote application provisioning service that provides virtual machine-hosted remote applications. The client computer system sends the received authentication credentials to an authentication service, which is configured to generate an encrypted token based on the received authentication credentials. The client computer system then receives the generated encrypted token from the authentication service, stores the received encrypted token and the received authentication credentials in a data store, and sends the encrypted token to the remote application provisioning service. The encrypted token indicates to the remote application provisioning service that the user is a valid user.

Optionally, the client computer system further receives, from the remote application provisioning service, an indication of remote applications the user is allowed to access. The client computer system receives, from the user, an indication indicating that at least one of the remote applications is to be instantiated. The client computer system then sends the user's stored authentication credentials and the stored encrypted token to the virtual machine that is hosting the specified remote application and, upon being authenticated to the virtual machine that is hosting the specified remote application, accesses the specified remote application.

In another embodiment, a remote application provisioning service receives an encrypted token from a client computer system, where the encrypted token is generated based on authentication credentials provided by a user. The remote application provisioning service decrypts the received encrypted token, determines the user's identity from the decrypted token, determines, based on the user's identity, which remote applications the user is authorized to access, and provides to the user an indication of those remote applications that are available for use.

In yet another embodiment, a remote application provisioning service receives an indication from a user indicating that a specified remote application is to be instantiated. The indication includes an encrypted token that was generated based on the authentication credentials. The remote application provisioning service then decrypts the received encrypted token to determine the user's identity, verifies that the user has permission to access the specified remote application, and sends the encrypted token to a remote application virtual machine host that provides access to the specified remote application using the encrypted token and the user's authentication credentials.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
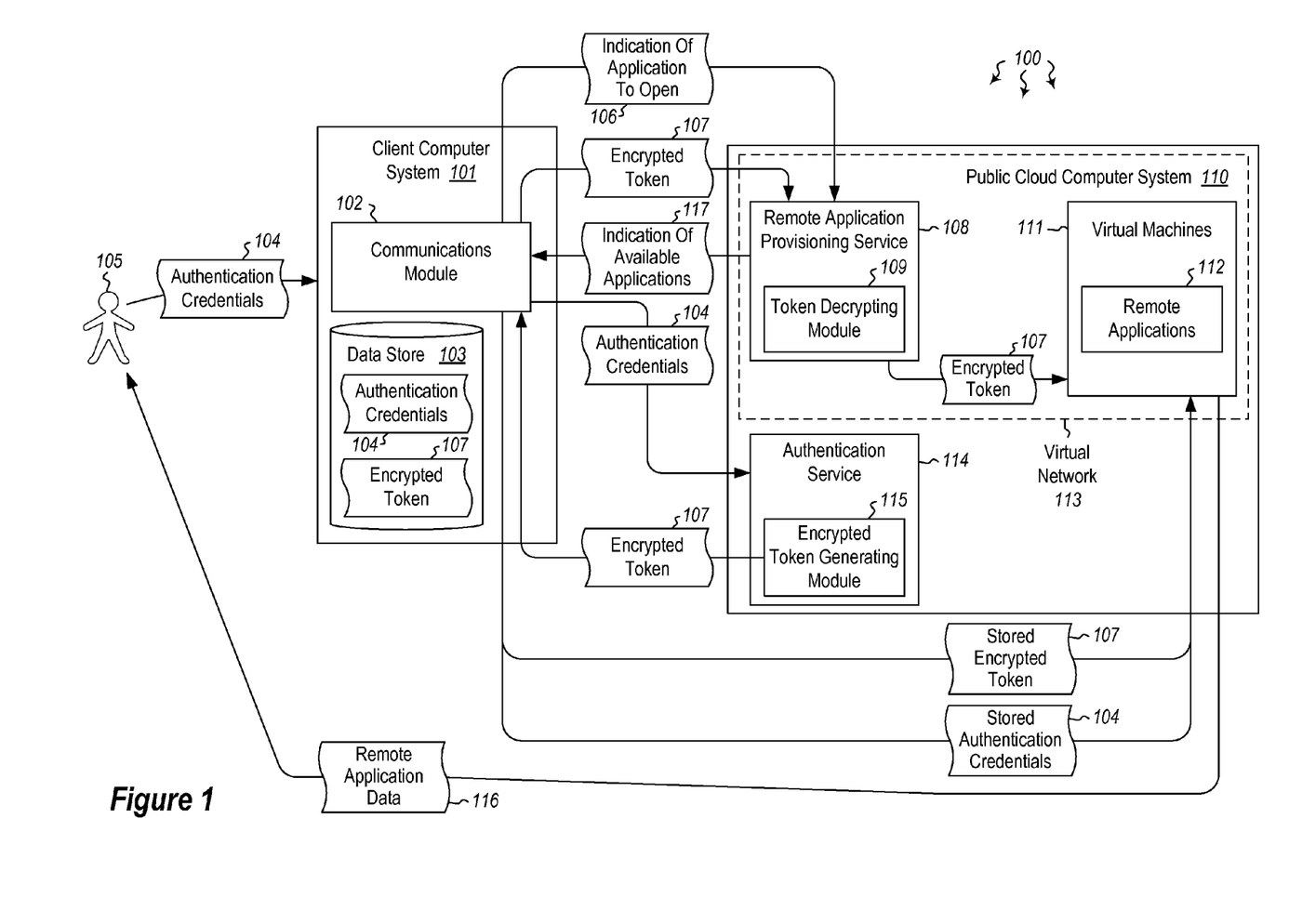
FIG. 1 illustrates a computer architecture in which embodiments described herein may operate including authenticating a user to a remote application provisioning service.

FIG. 1 illustrates a computer architecture 100 in which at least one embodiment may be employed. Computer architecture 100 includes client computer system 101 and public cloud computer system 110. Computer systems 101 and 110 may be any type of local or distributed computer system, including cloud computing systems. Each computing system includes modules for performing a variety of different functions. For instance, client computer system 101 includes a communications module 102. The communications module allows for data to be received and transmitted at the client computer system. For instance, user 105 may send or input authentication credentials 104 which are then transferred from the client computer system 101 to the authentication service 114 of public cloud computer system 110. At least in some embodiments, public cloud computer system 110 is a public-facing cloud computing system that can host a variety of different applications and services. These services may be spread over a variety of different physical computer systems or processors, which may be physically located substantially anywhere in the world.

The authentication service 114 may thus receive the authentication credentials 104 (which may include user name, password, biometric data or other credentials) from the client computer system 101. The encrypted token generating module 115 of the authentication service 114 may then generate an encrypted token 107 based on the received user credential 104. The encrypted token 107 may then be sent back to the client computer system 101. At least in some embodiments, the encrypted token 107, along with the user's credentials 104, may be stored in a data store 103, which may be local or remote to the client computer system 101.

The client computer system 101 may then send the encrypted token 107 to the remote application provisioning service 108, which is part of a virtual network 113 running on the public cloud computer system 110. The virtual network may be a private network associated with a corporation or other entity. This virtual network may provide access to sensitive data and, as such, outside users will typically need to authenticate before being granted access to the virtual network 113. In order to authenticate to the virtual network 113, the client computer system 101 sends the encrypted token 107 that was generated based on the user's authentication credentials 104. The user's credentials (at least in some embodiments), however, are not sent to the remote application provisioning service 108. The token decrypting module 109 decrypts the encrypted token 107, and determines who the user is, and whether they are a valid user. If they are a valid user, the remote application provisioning module 108 sends to the client computer system 101 an indication 117 of remote applications which are available to the user 105.

The user 105 can then provide an indication 106 of which of the available applications they would like to open. This indication is sent to the remote application provisioning module 108. At this point, the user's stored authentication credentials 104 and stored encrypted token 107 are sent to one or more of the virtual machines 111 that are running in the virtual network. These virtual machines are the computing systems that actually host the remote applications 112 of the corporation or other entity that owns or manages the virtual network 113. The stored authentication credentials 104 and stored encrypted token 107 are then used to log in and authenticate to the virtual machines. Once authenticated, the virtual machines 111 provide the remote application data 116 for the remote application(s) requested by the user (i.e. in indication 106).

In this manner, an end-user authentication and single sign-on (SSO) scheme is provided. This scheme includes client-side components that allow an end-user to connect to their remote applications by either going to a browser or subscribing to a feed that the corporation or other organization has set up for them. The user 105 enters their credentials 104 to connect to the application provisioning service 108. The client-side components accept the user credentials 104 and talks to the authentication service 114 to obtain an encrypted token 107. This token, along with the user credentials 104 are used subsequently to authenticate, authorize and complete a remote logon. The authentication service is configured to accept tokens for authentication. The authentication service 114 is able to make an authentication decision on the user using the token (e.g. end-user "x" is a valid account in company "y").

In some cases, the customer of the remote application provisioning service 108 (e.g. an enterprise) has set up a specific group of employees that have access to specific remote resources (e.g. applications 112). The service 108 then makes an authorization decision (e.g. is end-user "x" allowed access to remote resource "y"?) by making appropriate directory calls into the company's directory service. Once the user is authorized, a remote login may be established to the virtual machine application hosts. In some embodiments, the remote desktop protocol (RDP) may be used to establish a remote interactive login to the virtual machine(s) (VMs) that are joined to the customer's domain (i.e. are part of virtual network 113. This allows the end-user 105 to access their remote applications 112. As such, this provides enterprises a way to run their virtual desktop workloads using their corporate login accounts. These concepts will be explained further below with regard to methods 200, 300 and 400 of FIGS. 2, 3 and 4, respectively.

Figure 2:
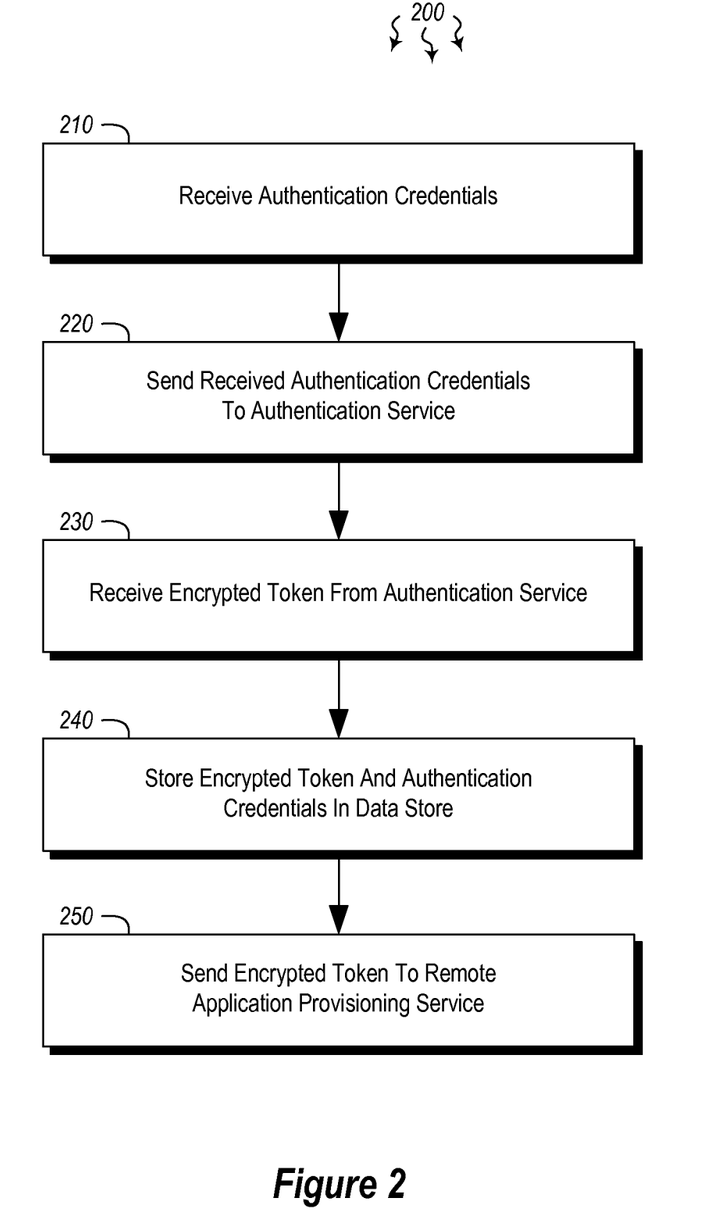
FIG. 2 illustrates a flowchart of an example method for authenticating a user to a remote application provisioning service.
Figure 3:
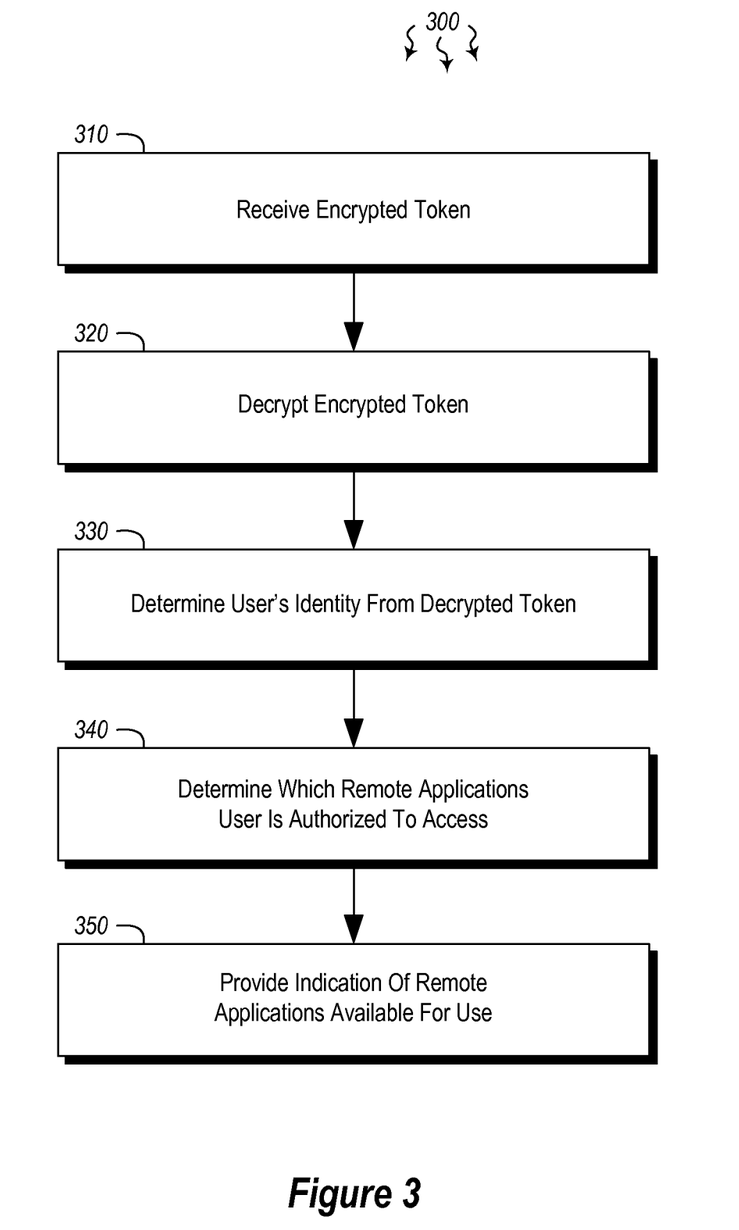
FIG. 3 illustrates a flowchart of an alternative example method for authenticating a user at a remote application provisioning service.
Figure 4:
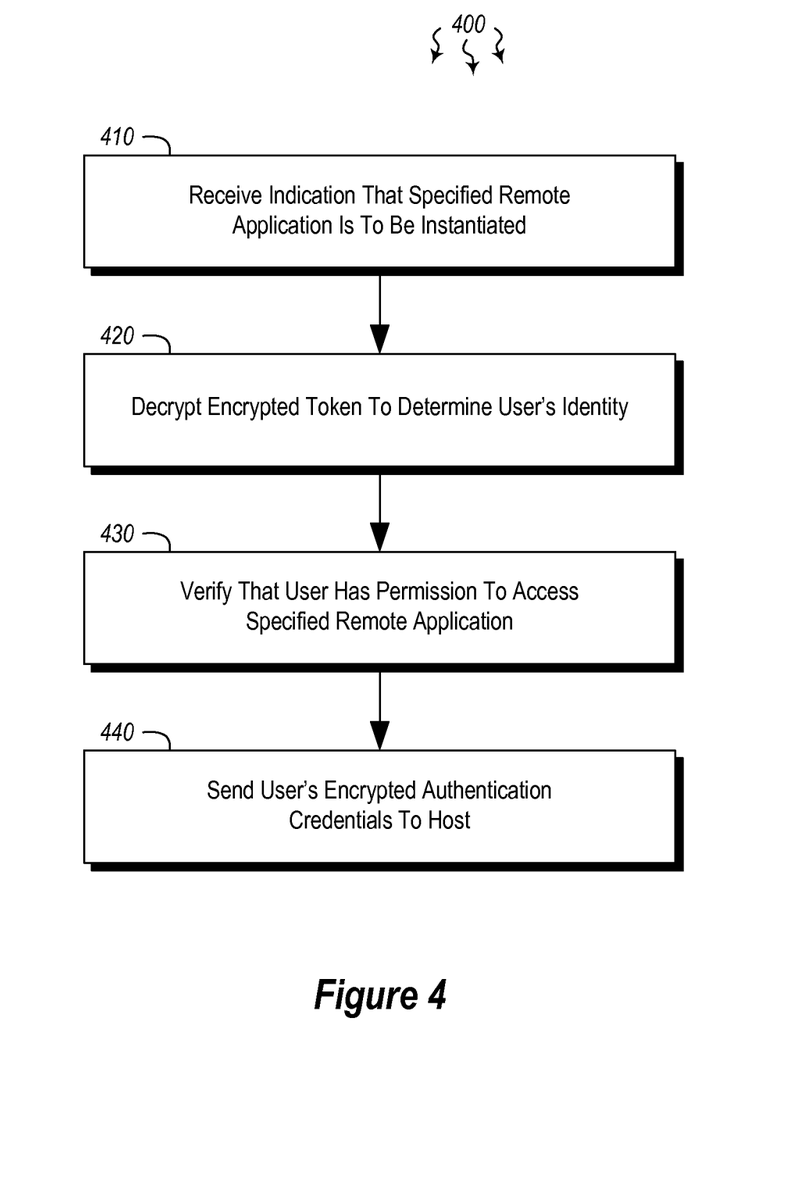
FIG. 4 illustrates a flowchart of an alternative example method for authenticating a user at a remote application provisioning service.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for authenticating a user to a remote application provisioning service. The method 200 will now be described with frequent reference to the components and data of environment 100.

Method 200 includes an act of receiving one or more authentication credentials from a user at the client computing system to authenticate the user to a remote application provisioning service that provides virtual machine-hosted remote applications (act 210). For example, client computer system 101 may receive authentication credentials 104 from user 105 who is using or providing inputs to the computer system 101. The authentication credentials may include user name, password, biometric information or other information that may be used to validate and authenticate a user, especially a user that is trying to access virtual machine-hosted remote applications 112. The communications module 102 of the client computer system 101 may then pass these authentication credentials on to the authentication service 114 running on the public cloud computing system 110. The encrypted token generating module 115 may use the received credentials to generate encrypted token 107. The encrypted token 107 is thus based on the authentication credentials 104 provided by the user 105.

Method 200 next includes an act of receiving the generated encrypted token from the authentication service (act 220). The client computer system 101 thus receives encrypted token 107 from the authentication service 114 running on the public cloud 110. This encrypted token 107 is then stored in a data store 103 along with the received authentication credentials 104 (act 230). As mentioned above, this data store 103 may be local or remote to the client computer system 101, and may comprise a single storage device, or an array of such devices such as a storage area network (SAN) or other cloud storage system. The client computer system 101 then sends the encrypted token 107 to the remote application provisioning service 108. The encrypted token indicates to the remote application provisioning service that the user is a valid user (act 240). Because the user is a valid user, the remote application provisioning module 108 may further determine which remote applications 112 the user 105 has access to. An indication 117 may be sent to the client computer system 101 indicating a list of remote applications the user has access to.

The remote applications 112 to which the user has access may be displayed in a list or other arrangement. Each remote application may be represented by an icon, thumbnail or other image. To launch the remote application, the user may click on, touch or otherwise select an icon of the application. In response to the user's input 106, the client computer system 101 sends the user's stored authentication credentials 104 and the stored encrypted token 107 to the virtual machine 111 that is hosting the specified remote application 112. Then, upon being authenticated to the virtual machine that is hosting the specified remote application, the user is permitted to access the user-specified instantiated remote application 112.

The encrypted token generating module 115 may generate the encrypted token 107 such that it is only decryptable by the remote application provisioning service 108 and/or the virtual machine 111 that is hosting the specified remote application 112. Once the user has been authenticated using the token 107 and the credentials 104, the remote application data 116 is sent to the user 105. The user-specified remote application may be accessed using a remote desktop protocol (RDP) session established between the virtual machine 112 and the client computer system 101. Within the RDP session, the user may also access other remote applications to which they have been given access by the entity managing the virtual network 113.

In some embodiments, a previously generated, cached encrypted token 107 may be sent with the user's authentication credentials 104 to the remote application provisioning service. Thus, in cases where the user is accessing the remote applications through a browser, the browser can look in a cache (e.g. data store 103), and if an encrypted token already exists, it can send that token instead of (at least in some cases) sending the user's credentials to the authentication service 114 for generation of an encrypted token. In some cases, connection data may be sent to the remote application provisioning service 108 in addition to the encrypted token 107. The connection data indicates how the connection between the client computer system 101 and the remote application provisioning service 108 is to be established. The connection data may include port numbers, protocols, hardware IDs or any other data used to establish a connection.

Figure 5:
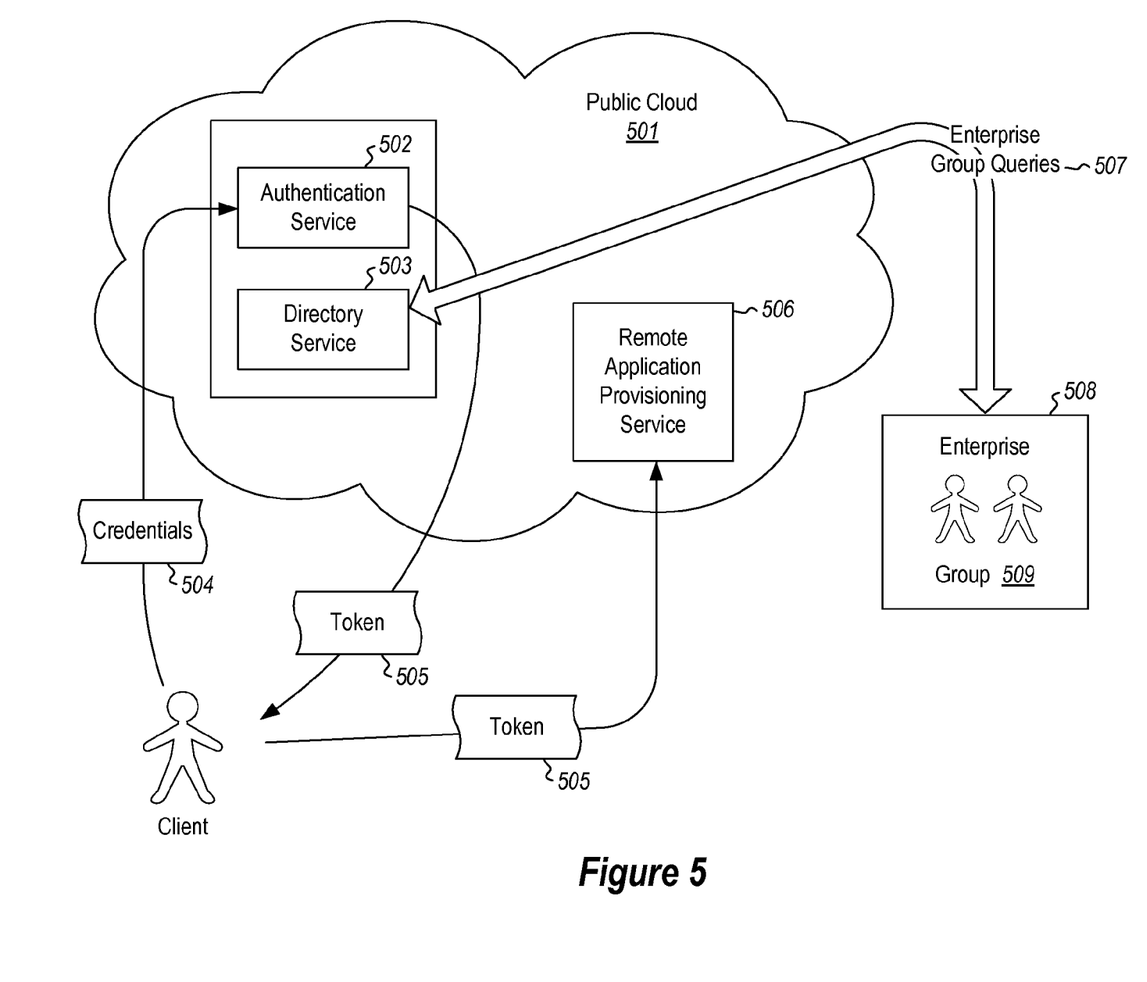
FIG. 5 illustrates a computing architecture in which users are authenticated at a remote application provisioning service

As shown in FIG. 5, the authentication service 502 may further verify that the user (e.g. 105) is a member of an organization that is providing the virtual machine-hosted remote applications. For example, enterprise 508 may be the organization providing or managing the virtual network 113 of FIG. 1. The enterprise may have different groups of users 509 that are assigned different remote applications. The user may thus send their credentials 504 to the authentication service 502, which generates an encrypted token 505 based on the credentials. The directory service 503 of the authentication service 502 may be used to send an enterprise group query 507 to determine, based on the user's credentials 504, whether the user is allowed to access a specified application, or whether the user is a member of a group that has access to a specified remote application. If the directory service 503 determines that the user does belong to the enterprise group 509 that has access to a user-specified application, the user will be given access to that application, and the remote application provisioning service 506 will be notified of the user's group membership. At least in some cases, a relationship of trust exists between the authentication service and the remote application provisioning services within the public cloud 501.

The client computer system 101 may present available applications to the user in a variety of ways. For example, the user may enter their authentication credentials 104 at a web page provided by the remote application provisioning service 108 (or by another service running on the cloud 110). Once properly authenticated, the remote applications 112 available to the user may be presented on the web page. In other cases, the user may enter their authentication credentials 104 via a remote application that was presented in a list of remote applications to which the user is subscribed. This list of applications may be shown in a control panel or other window in the client computer system's operating system. In some embodiments, it should be noted that the client computer system 101 may determine that a specified period of time has elapsed since the encrypted token 107 was generated. If this specified amount of time expires, the user's authentication credentials 104 may be resent to the authentication service 108 for reissuance of the token. The token may then be sent to the remote application provisioning service in a hypertext transfer protocol (HTTP) header, for example, or via some other transport.

FIG. 3 illustrates a flowchart of a method 300 for authenticating a user at a remote application provisioning service. The method 300 will now be described with frequent reference to the components and data of environment 100.

Method 300 includes an act of receiving, at a remote application provisioning service, an encrypted token from a client computer system, the encrypted token being generated based on authentication credentials provided by a user (act 310). As mentioned above, the remote application provisioning service 108 may receive encrypted token 107 from client computer system 101, where the encrypted token was generated by module 115 based on the user's credentials 104. The token decrypting module 109 may then decrypt the received encrypted token (act 320).

The remote application provisioning module 108 may further determine the user's identity from the decrypted token (act 330), determine, based on the user's identity, which remote applications the user is authorized to access (act 340), and provide to the user an indication 117 of those remote applications that are available for use (act 350). These applications may be provided to the user in a web interface, in an operating system (OS) folder, or in some other manner. The available applications may each have their own representative icon or thumbnail image. The web page or OS folder may include those remote applications to which the user is subscribed or is otherwise permitted access.

FIG. 4 illustrates a flowchart of a method 400 for authenticating a user to a remote application provisioning service. The method 400 will now be described with frequent reference to the components and data of environment 100.

Method 400 includes an act of receiving, at a remote application provisioning service, an indication from a user indicating that a specified remote application is to be instantiated, the indication including an encrypted token that was generated based on the authentication credentials (act 410). The remote application provisioning service 108 may thus receive indication 106 from user 105 indicating that a user-specified remote application 112 is to be opened. The indication may include the encrypted token 107 that was generated based on the user's authentication credentials. The token and credentials may have been stored in data store 103 before transfer to the remote application provisioning service 108. The token decrypting module 109 may then decrypt the received encrypted token to determine the user's identity (act 420), and verify that the user has permission to access the specified remote application (act 430). The remote application provisioning service 108 may then send the encrypted token 107 to remote application virtual machine host 111 that provides access to the specified remote application 112 using the encrypted token and the user's authentication credentials (act 440).

The remote applications 112 provided by the virtual machines that are within the virtual network 113 may provide access to private resources belonging to the enterprise 508 or other organization to whom the user belongs. The user's authentication credentials may be used to both determine which applications are available to the user and to log the user in to the virtual machine host that provides the specified remote application. Thus, the embodiments illustrated in FIG. 1 facilitate claims-based authentication (which typically involves a user name and password), and token-based authentication (which uses the encrypted token 107). The encrypted token 107 can be sent (by itself) to the remote application provisioning service 108 to determine which applications are available to the user. The token and user name/password are then used to authenticate the user to the virtual machine(s) that provide the user-specified remote applications 112. In this manner, two different and distinct authentication systems work together to authenticate the user and allow them access to their (enterprise-provided) remote applications. Accordingly, methods, systems and computer program products are provided which authenticate a user to a remote application provisioning service.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A client computer system comprising the following:
   one or more processors;
   system memory;
   one or more computer-readable storage media having stored thereon computer-executable instructions that, when executed by the one or more processors, causes the computing system to perform a method for authenticating a user to a remote application provisioning service, the method comprising the following:
   an act of receiving one or more authentication credentials from a user at the client computing system to authenticate the user to a remote application provisioning service that provides virtual machine-hosted remote applications;
   an act of sending the received authentication credentials to an authentication service, the authentication service being configured to generate an encrypted token based on the received authentication credentials;
   an act of receiving the generated encrypted token from the authentication service;
   an act of storing the received encrypted token and the received authentication credentials in a data store; and
   an act of sending the encrypted token and the authentication credentials to a virtual machine that is hosting a particular application prior to the particular application being instantiated for the user, the encrypted token being used with the authentication credentials to facilitate a logon at the virtual machine.

2. The client computer system of claim 1, the method further comprising:
   an act of sending the encrypted token to the remote application provisioning service, the encrypted token indicating to the remote application provisioning service that the user is a valid user;
   an act of receiving from the remote application provisioning service an indication of one or more remote applications the user is allowed to access, including the particular application;
   an act of receiving from the user an indication indicating that the particular application is to be instantiated; and
   upon being authenticated to the virtual machine that is hosting the specified remote application, an act of accessing the particular application.

3. The client computer system of claim 2, wherein the token is encrypted such that it is only decryptable by the virtual machine that is hosting the particular application.

4. The client computer system of claim 3, wherein the specified remote application is accessed using a remote desktop protocol (RDP) session established between the virtual machine and the client computer system.

5. The client computer system of claim 1, wherein a previously generated, cached encrypted token is sent with the user's authentication credentials to the remote application provisioning service.

6. The client computer system of claim 1, wherein one or more portions of connection data are sent to the remote application provisioning service in addition to the encrypted token, the connection data indicating how the connection between the client computer system and the remote application provisioning service is to be established.

7. The client computer system of claim 1, wherein the authentication service further verifies that the user is a member of an organization that is providing the virtual machine-hosted remote applications.

8. The client computer system of claim 1, wherein the authentication credentials are received at a web page provided by the remote application provisioning service.

9. The client computer system of claim 1, wherein the authentication credentials are received from a remote application that was presented in a list of remote applications to which the user is subscribed.

10. The client computer system of claim 1, the method further comprising:
    an act of determining that a specified period of time has elapsed since the encrypted token was generated; and
    an act of resending the user's authentication credentials to the authentication service for reissuance of the token.

11. The client computer system of claim 1, wherein the token is sent to the remote application provisioning service in a hypertext transfer protocol (HTTP) header.

12. One or more computer hardware storage device having stored computer-executable instructions that are executable by one or more processor of a computing system for implementing the following:
    receiving one or more authentication credentials from a user at the client computing system to authenticate the user to a remote application provisioning service that provides virtual machine-hosted remote applications;
    sending the received authentication credentials to an authentication service, the authentication service being configured to generate an encrypted token based on the received authentication credentials;
    receiving the generated encrypted token from the authentication service;
    storing the received encrypted token and the received authentication credentials in a data store; and
    sending the encrypted token and the authentication credentials to a virtual machine that is hosting a particular application prior to the particular application being instantiated for the user, the encrypted token being used with the authentication credentials to facilitate a logon at the virtual machine.

13. The one or more computer hardware storage device of claim 12, wherein the token is encrypted such that it is only decryptable by the virtual machine that is hosting the particular application.

14. The one or more computer hardware storage device of claim 12, wherein a previously generated, cached encrypted token is sent with the user's authentication credentials to the remote application provisioning service.

15. The one or more computer hardware storage device of claim 12, the stored computer-executable instructions further being executable by the one or more processor for implementing the following:
    an act of determining that a specified period of time has elapsed since the encrypted token was generated; and
    an act of resending the user's authentication credentials to the authentication service for reissuance of the token.

16. A computer-implemented method for authenticating a user to a remote application provisioning service, the method comprising the following:
    receiving one or more authentication credentials from a user at the client computing system to authenticate the user to a remote application provisioning service that provides virtual machine-hosted remote applications;
    sending the received authentication credentials to an authentication service, the authentication service being configured to generate an encrypted token based on the received authentication credentials;
    receiving the generated encrypted token from the authentication service;
    storing the received encrypted token and the received authentication credentials in a data store; and
    sending the encrypted token and the authentication credentials to a virtual machine that is hosting a particular application prior to the particular application being instantiated for the user, the encrypted token being used with the authentication credentials to facilitate a logon at the virtual machine.

17. The method of claim 16, wherein the token is encrypted such that it is only decryptable by the virtual machine that is hosting the particular application.

18. The method of claim 16, wherein a previously generated, cached encrypted token is sent with the user's authentication credentials to the remote application provisioning service.

19. The method of claim 16, the method further comprising the following:
    an act of determining that a specified period of time has elapsed since the encrypted token was generated; and
    an act of resending the user's authentication credentials to the authentication service for reissuance of the token.

20. The method of claim 16, the method further comprising:
    an act of sending the encrypted token to the remote application provisioning service, the encrypted token indicating to the remote application provisioning service that the user is a valid user;
    an act of receiving from the remote application provisioning service an indication of one or more remote applications the user is allowed to access, including the particular application;
    an act of receiving from the user an indication indicating that the particular application is to be instantiated; and
    upon being authenticated to the virtual machine that is hosting the specified remote application, an act of accessing the particular application.

* * * * *